Aug. 31, 1954  A. SERAGNOLI  2,687,649
MOTION CONVERTING MECHANISM
Filed Sept. 12, 1950

INVENTOR
*Ariosto Seragnoli*
BY
*Harry Ernest Rubens*
ATTORNEYS

Aug. 31, 1954   A. SERAGNOLI   2,687,649
MOTION CONVERTING MECHANISM
Filed Sept. 12, 1950
3 Sheets-Sheet 2
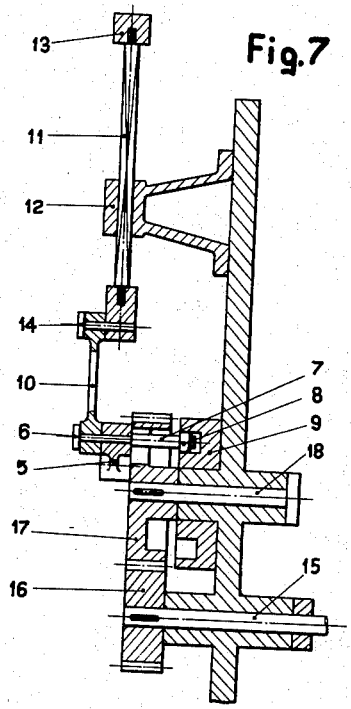
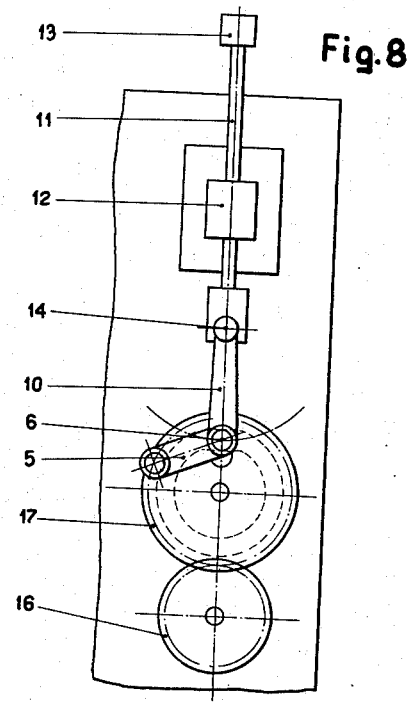
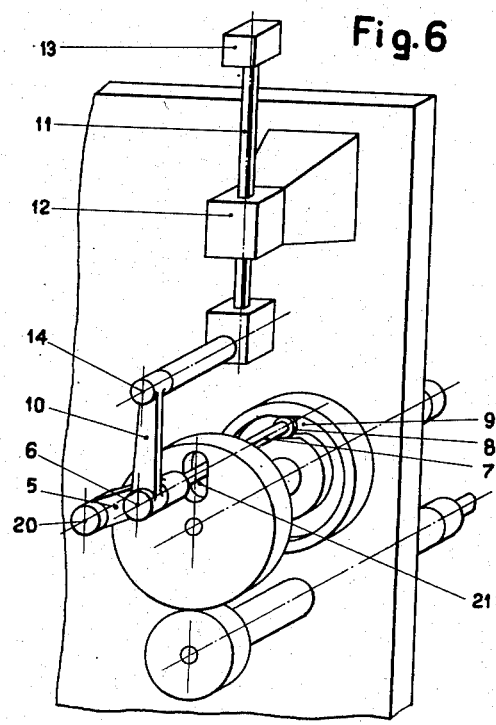
INVENTOR
*Ariosto Seragnoli*
BY
*Harry Ernest Rubens*
ATTORNEYS Aug. 31, 1954

A. SERAGNOLI 2,687,649

MOTION CONVERTING MECHANISM

Filed Sept. 12, 1950

INVENTOR
*Ariosto Seragnoli*
BY
*Harry Ernest Rubens*
ATTORNEYS

Patented Aug. 31, 1954

2,687,649

UNITED STATES PATENT OFFICE 2,687,649

MOTION CONVERTING MECHANISM

Ariosto Seragnoli, Bologna, Italy

Application September 12, 1950, Serial No. 184,378

4 Claims. (Cl. 74—44)

In the normal connecting rod and crank mechanisms the movements of the slide depend on the rotation of the crank in accordance with the law shown in Fig. 1 in the continuous section line in this figure are shown in abscissa the rotation angles α of the crank, in ordinates are shown the movements Y of the slide from the median position.

In this mechanism the slide remains stationary only in correspondence to the dead centres A and B, Fig. 1.

In automatic machines (for wrapping, banding, packaging, cartoning, conditioning, printing etc.), it is frequently necessary that the slide remains stationary for angles α of definite amplitude, usually at one or at both extremes of travel also sometimes for example, according to the way shown in Fig. 2 in which α and Y have the same meaning assigned them as in Fig. 1, while it does not usually matter according to which law the other movements occur. The most frequent case is that a stationary phase is required at one end of the travel, as shown by mixed even and dotted line marked CDEBC' in Fig. 1. These movements can be obtained by means of a crank with periodically variable arm through a cam system by which the cam can be of small dimensions as it must only supply the travel corresponding to differences of ordinates yA—yD (Fig. 1).

One object of the present invention is a mechanism comprising a shaft having an overhung crank on which an oscillating link is pivoted (placed on the outer side in respect of the crank) the end of which is guided, through a special appendix, in a fixed cam (placed on the inner side in respect of the crank).

The said end of the oscillating link has a crank pin (which operates the slide through a connecting rod) and its distance from the rotation axis is periodically variable according to the shape of the cam. The law concerning the stroke of the slide is deformed, in respect of that concerning the simple crank which is approximately a sine curve, by the action of the cam and can satisfy the conditions laid down in the preface of this description.

Another object of the invention is a mechanism having a gear wheel operated by a gear, which is carried by a fixed or turning axle and is free to rotate. This wheel has an eccentric pivot, on which an oscillating link is pivoted, which operates in the same manner above described in conjunction with the same parts above mentioned.

The appendix which receives the cam action passes through an appropriate passage in the disc or through the spokes of the wheel.

Another object of the invention consists in disposing the fulcrum carrying the link and the extremity of the link itself (this latter bearing the crank pivot of the connecting rod which operates the slide and the appendix which receives the action of the cam coaxial between themselves) so that the radius which passes through the rotation axis and the crank pivot (extremity of the link) be perpendicular to the link in the mean position of oscillation in order to obtain that the crank pin move practically in a radial direction.

Another object of the invention is the shape that has to be given to the cam so as to obtain a phase of rest at a dead centre: the cam takes, at the position corresponding to the rest, the shape of the arc of a circle having the centre in the fulcrum of the connecting rod on the slide (big end) and radius equal to the length of the same connecting rod. The cam may be partly concave and partly convex, or entirely convex, according to whether the dead centre corresponding to the rest be the upper or the lower; both the above mentioned solutions are objects of the invention.

The invention consists of the new shapes, disposition and combination of parts, achieved as an example in the appliances described in the text and illustrated in a few preferred aspects of realisation; other objects, shapes and advantages will appear more clearly from the detailed description taken in connection with the attached drawings, which form an integral part of the description itself.

In the said drawings the same numbers are used to indicate the same parts through the different views and sections and in the different solutions preferred.

Fig. 6 illustrates a schematic prospective drawing of the invention in a second preferred method of accomplishment.

Fig. 7 illustrates a longitudinal section of Fig. 6.

Fig. 8 illustrates a front view of Fig. 6.

Figure 1:
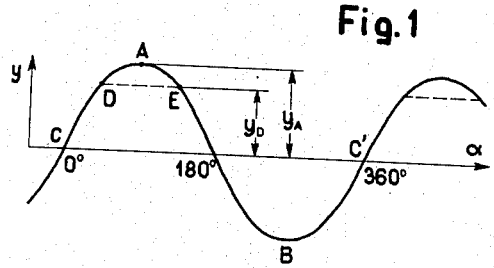
Fig. 1 illustrates a diagram of the travel y of the slide according to angles α described by the crank.
Figure 2:
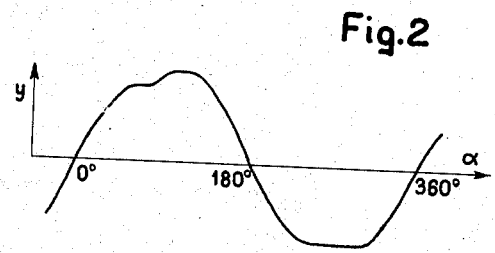
Fig. 2 illustrates another type of diagram that can be obtained with the present invention.
Figure 3:
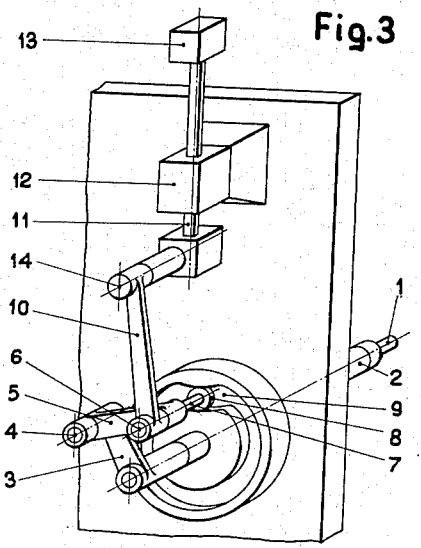
Fig. 3 illustrates a schematic prospective drawing of the invention in a first preferred method of accomplishment.
Figure 4:
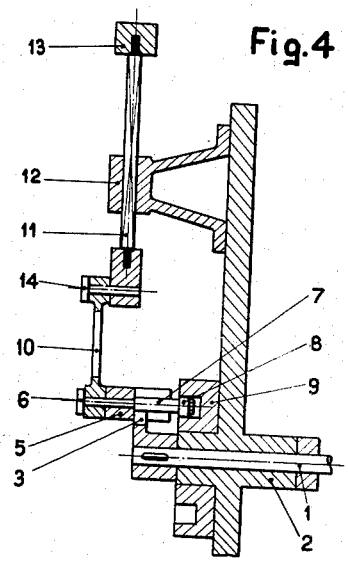
Fig. 4 illustrates a longitudinal section of Fig. 3.
Figure 5:
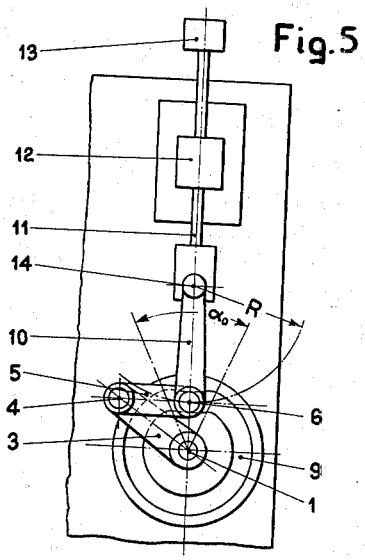
Fig. 5 illustrates a front view of Fig. 3.

Let us consider Figures 3, 4 and 5. The motor shaft 1, operating in the bushing 2, has, at its free extremity, a rigidly splined crank. On the crank pin 4, is pivoted one extremity of the oscillating link 5; the other extremity carries on one side a second crank pin 6, on the other side it carries an appendix 7 which, through a little roller 8, is engaged in the path of cam 9 and which determines the distance from the rotation axle of the second crank pin 6. This latter, through connecting rod 10, operates the slide 11 which runs in the guide 12 fixed on the casting, and moves, according to the invention, part 13 which directly operates or indirectly controls the required movements for the operation of the machine. The oscillating link 5 and the connecting rod 10 are linked one upon the other through pin 6, so as to be able to rotate them between each other.

From Fig. 5 it is evident that, if one desires that for all of the arc α the slide remain stationary, it is necessary that in correspondence to said arc the cam be profiled as sector having the centre on axle 14 of the small end pin and radius R of equal length to that of the connecting rod; characteristic which is one of the objects of the patent.

Figure 9:
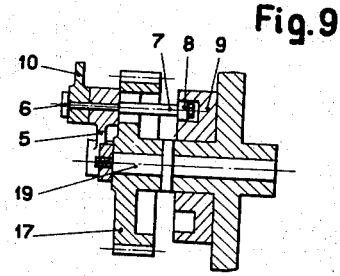
Fig. 9 illustrates a longitudinal section of the invention in a third preferred method of accomplishment.

In Figs. 6, 7, 8, and 9, in prospective or in orthogonal projections and sections is shown a second preferred method of accomplishment. This differs from the one previously described because the motor shaft 15 operates the variably eccentric crank through a gearwheel 16. This engages with gearwheel 17, carried on idling shaft 18. Solution shown in Fig. 9, is also considered in which gearwheel 17 is idling on the fixed shaft 19.

Gear 17 has a pin 20 on which oscillating link 5 is pivoted, connected with connecting rod 10 and cam 9 through the same parts previously described.

In the disc of gear 17 a passage 21 is provided through which appendix 7 can pass to engage cam 9; if the gear has spokes, appendix 7 can pass between two spokes.

Figure 10:
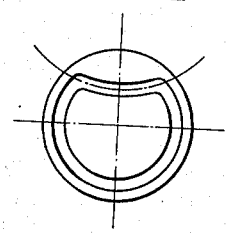
Fig. 10 illustrates the shape of the convex-concave cam.
Figure 11:
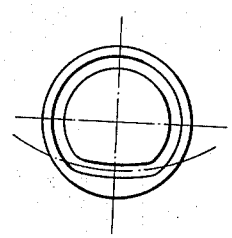
Fig. 11 illustrates the shape of the convex cam.

With these two solutions if a pause stage is desired at the top dead centre the cam must have at the corresponding point a concave channel as shown in Fig. 10 while if the pause stage has to take place at the lower dead centre one would always have a convex channel as shown in Fig. 11.

Figure 12:
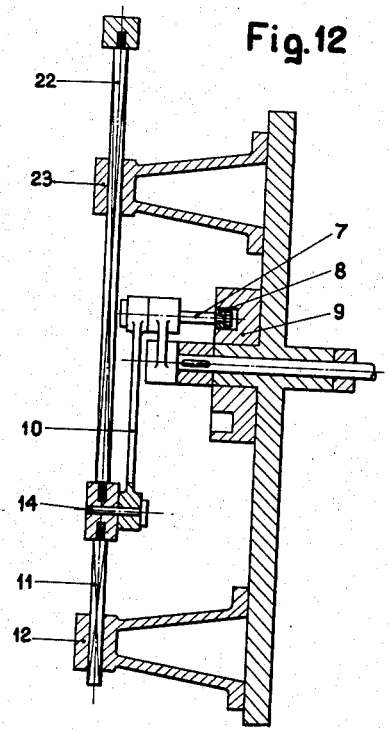
Fig. 12 illustrates the longitudinal section of a fourth preferred method of accomplishment.
Figure 13:
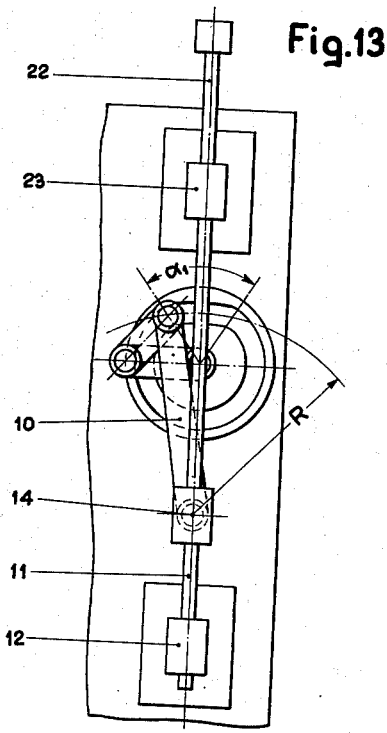
Fig. 13 illustrates a projection to the right of Fig. 12.

Figures 12 and 13 show another preferred solution to be used in order to have always a convex cam even if the pause stage must always occur at the top dead centre. This is obtained, as is evident from the drawing, by turning over the crank mechanism, so that the pause stage is obtained in correspondence to the sector α' concentric with the centre of the small-end pin 14 and having a radius R equal to the length of the connecting rod. The movement of slide 11 is brought upwards through the shaft 22 which, if necessary, can be guided through support 23.

A feature of the invention is that of disposing link 5 so that in the median position of oscillation line 4—6 will result perpendicular to line 1—6; in this manner the second crank pin 6 will move with sufficient approximation along a radius and one has the most simple conditions for the correspondence of the pause.

Having thus particularly described and ascertained the nature of my said invention and a few preferred manners in which it can be performed, it is obvious and should be properly understood that the elements as have been described may be widely modified in their shape and mutual arrangements without departing from the scope and basic features of the invention itself as defined in the following claims.

What I claim is:

1. In a driving mechanism for wrapping machines of the type specified, a driving shaft; an overhung crank, with a crankpin, carried on said driving shaft; a link pivoted on said crankpin; a stationary cam; an appendix, connected with the link, guided by said stationary cam; a second crankpin, carried by the link; a slide; a connecting rod pivoted at one end on said second crankpin and at the other end of the slide; all constituting a connecting rod and crank mechanism with periodically variable arm, which operates the slide by a law dependent from the proportions of the crank movement and of the cam.

2. In a driving mechanism for wrapping machines of the type specified, a driving gear; a crankpin carried on said driving gear; a link pivoted on said crankpin; a stationary cam; an appendix, connected with the link, guided by said stationary cam; a second crankpin, carried by the link; a slide; a connecting rod pivoted at one end on said second crankpin and at the other end on the slide; all constituting a connecting rod and crank mechanism with periodically variable arm, which operates the slide by a law dependent from the proportionment of the gear movement and of the cam.

3. In the mechanism of claim 1, wherein the second crankpin is coaxially arranged with the appendix guided by the stationary cam.

4. In the mechanism of claim 2 wherein the second crankpin is coaxially arranged with the appendix guided by the stationary cam.

References Cited in the file of this patent

UNITED STATES PATENTS

| Number | Name | Date |
| --- | --- | --- |
| 763,742 | Emerson | June 28, 1904 |
| 995,948 | Bracken | June 20, 1911 |
| 1,970,960 | Groff | Aug. 21, 1934 |
| 2,463,604 | Denyssen | Mar. 8, 1949 |